Feb. 5, 1935.  H. J. J. M. DE R. DE BELLESCIZE  1,990,428
SYNCHRONIZING SYSTEM
Filed Sept. 29, 1932    4 Sheets-Sheet 2

Inventor
H.J.J.M.deR.de Bellescize,
by John O. Brady
Attorney

Patented Feb. 5, 1935

1,990,428

UNITED STATES PATENT OFFICE

REISSUED 1,990,428

SYNCHRONIZING SYSTEM

Henri Jean Joseph Marie de Regnauld de Bellescize, Neuilly-sur-Seine, France

Application September 29, 1932, Serial No. 635,451
In France October 6, 1931

12 Claims. (Cl. 250—20)

My invention relates broadly to oscillation systems and more particularly to a method and circuit arrangement for synchronizing local oscillations with respect to impressed oscillations.

The present invention is directed to improvements in methods whereby a first sinusoidal oscillation $S \sin (2\pi F_s.t + \phi_s)$ is utilized for obtaining a second sinusoidal oscillation $$H \sin (2\pi F_h.t + \phi_h),$$

which is characterized in that its amplitude H and its phase difference from the first oscillation, namely $(2\pi F_h.t + \phi_h) - (2\pi F_s.t + \phi_s)$, are both substantially constant. In the case for instance, of a message transmitted by wire or electromagnetic Hertzian waves, one of the oscillations is the carrier or pilot wave of the signal and it is required to obtain in the receiver a local oscillation which is in step with the carrier wave.

In all the arrangements enabling such a synchronous oscillation to be obtained, the receiving apparatus is provided with a circuit specially designed for the purpose, and the wave-band of which should be rendered as narrow as possible, or the time constant as large as possible. Up to the present it has never been possible to make the band-width less than the sum $f_s$ of the changes liable to affect one or the other of the frequencies $F_h$, $F_s$. In many instances this sum $f_s$ is, itself, the resultant of two kinds of superimposed changes: the one kind developing at an extremely slow rate but capable of attaining a very considerable amplitude $(f_s)_1$, in the long run—namely, the change progressively affecting the frequency of the transmitting station in relation to the oscillation generators of the receiver, by reasons of slow changes in the temperature of potential of the sources of supply. The other changes, $(f_s)_2$, are of much smaller amplitude than the foregoing, but develop or disappear far more rapidly, and arise for example, from modifications in the course of the Hertzian waves, or the slight mechanical tremors which inevitably affect the circuits of the transmitting and receiving stations. Hitherto, the receiving circuits specially allocated to the production of the local synchronous oscillation had to have a band with a width at least equal to $$f_s = (f_s)_1 + (f_s)_2,$$

or, which amounts to the same thing, a time constant inversely proportional to $f_s$. The term $(f_s)_1$ being by far the more important, it is desirable that it should be corrected independently by providing an arrangement that is specially intended to modify, progressively, the regulating of one or more oscillation generators in the receiver, so as to adapt said regulation to the slow variations $(f_s)_1$ which the frequency $F_s$ of the carrier or pilot oscillation undergoes. This forms the object of the present invention, which consequently describes a new method and a manner of carrying it into effect.

According to the present invention the method broadly consists in so controlling the frequency of one of the said oscillations that gradual frequency changes are counteracted.

The method of my invention further comprises combining the said oscillations as to produce a physical agency slowly varying in accordance with the said gradual frequency changes, selecting said slow variations of the physical agency and controlling thereby the frequency of one of said oscillations.

More particularly the method consists in combining in the receiver two devices, the first of which is an arrangement controlling the frequency of the local generator by impressing on the frequency of one of the two oscillations H or S, a correction which from instant to instant compensates the frequency difference which the very slow variations $(f_s)_1$ would tend to introduce between two frequencies $F_h$, $F_s$; while the second device, which, when combined with the first one, has only to take account of the variation of greater rapidity but of very small magnitude, maintains the two oscillations in step with one another.

The procedure, in accordance with this method, consists in generating the local synchronous oscillation by utilizing for that purpose an oscillator connected with circuits which have a wave band having a width equal, or slightly superior, to the amplitude $(f_s)_2$ of the relatively rapid but slight frequency changes. Under these conditions, these are the best possible circuits, but, after being in operation for a certain time they no longer suffice to correct the very slow variations, the magnitude $(f_s)_1$ of which becomes excessive after the lapse of a predetermined time interval. In proportion as the said magnitude increases, the local synchronous oscillation would become progressively out of phase in relation to the control oscillation; the phase difference angle $\Psi$ would vary and be subject to an error $\Delta\Psi$ the value of which would finally become excessive. By the employment of suitable means, this error $\Delta\Psi$ is utilized for modifying the intensity of a current, or a difference of potential, and, by the agency of said current, or difference of potential, the regulation of an oscillation generator in the receiver is automatically controlled. This control, the effect of which is to limit the error $\Delta\Psi$, is exercised through the agency of circuits which are distinct from the foregoing and have extremely large time constants, so as to respond solely to the very gradual variations $(f_s)_1$.

The nature of my invention will be more fully set forth in the following specification by reference to the accompanying drawings, in which.

Figure 1:
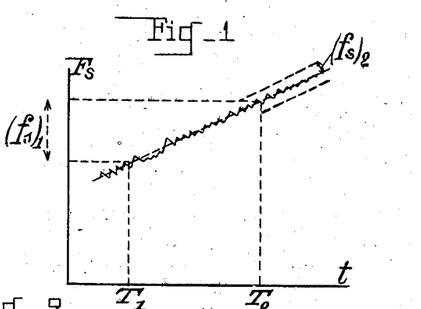
Figure 1 is a characteristic curve representing the variations $(f_s)_1$ and $(f_s)_2$—as a function of the time $t$—sustained by the carrier frequency $F_s$ while functioning in the interval between the instants $T_1$ and $T_2$.

Referring to the drawings in detail, Fig. 1 shows a curve which has been plotted with time as the abscissa and frequency as ordinates. From the characteristic curve it will be seen that the mean value of the carrier frequency $F_s$ varies slowly by $(f_s)_1$ periods, during the time interval $T_1T_2$, and that the momentary value of said frequency undergoes—with regard to its mean value—fluctuations which are more or less rapid, but of small magnitude, not exceeding $(f_s)_2$ periods.

Figure 2:
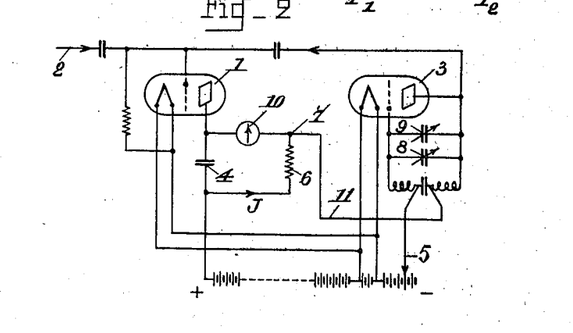
Fig. 2 is a circuit diagram by which I have explained the coaction of local and incoming oscillations in a signal receiving circuit.

The synchronizing arrangement of Fig. 2 is the one forming the subject of my copending application Serial Number 574,858, filed November 13, 1931, entitled Synchronization system. The principle of this method will first be reviewed as a knowledge of the same is necessary for an understanding of the present invention. The signal, received at 2 synchronizes the local electron tube generator 3 which supplies the receiver with the synchronous oscillations necessary for its operation. In order to obtain this synchronism, both the signal and the electron tube generator 3 excite, either directly or through interposed circuits of any kind, an electron tube detector 1, the plate circuit of which comprises a resistance 6 shunted by a condenser 4, which may be replaced by a low pass filter. The time constant of the unit 4—6 is so determined as to pass, without appreciable weakening or change of phase, the currents varying at a frequency equal to or less than the variations $(f_s)_2$ represented in Fig. 1 and to suppress the currents varying at higher frequencies. Under these conditions the current in the resistance 6 is exclusively furnished by the mutual modulation of the local oscillation and the carrier oscillation, in the detector tube 1. This current has the form:

$$J = J_0 + k.S. \cos \psi.$$

In this expression $J_0$ is a mean current, $k$ is a numerical coefficient depending on the sensitiveness of the detector tube 1 and on the constant amplitude H of the local oscillation, S is the amplitude of the carrier or pilot oscillation, and $\psi$ is the previously defined angle. So long as the frequencies $F_h$ and $F_s$ differ appreciably, regulation not having been effected, the term $kS \cos \psi$ represents an alternating current to which the D. C. milliammeter 10 does not respond, said milliammeter then indicating the mean current $J_0$, which is thus easily known. On synchronization $(F_h = F_s)$, the term $k.S. \cos \psi$ represents, on the contrary, a continuous current, the intensity $k.S. \cos (\Phi_h - \Phi_s)$ of which depends on the phase different $\Phi_h - \Phi_s$. This current is utilized for controlling the frequency $F_h$ of the generator 3. For example, the plate circuit of said generator is fed by the conductor 11 from the connection 7, the potential of which is determined by the value of the current $J$ in the resistance 6. This potential across resistance 6 changes the effective plate potential of oscillator 3, thereby changing its internal plate conductance and therefore its frequency of oscillation. The frequency $F_h$ of the generator 3 depends therefore, not only on the tuning of the main condenser 8 and its vernier adjustment condenser 9, but also on the current $J$ and the angle $\psi$. Consequently, this frequency varies between a certain upper limit $F_h + f_h$ when the angle $\psi$ is zero and the current $J_0 + kS$, and a certain lower limit $F_h - f_h$, when the angle $\psi$ is equal to $\pi$ and the current is $J_0 - kS$. It is assured for instance by suitably selecting the grid-bias connection 5, that the maximum correction $\pm f_h$ thereby applied to the frequency $F_h$ of the generator 3, when the current $J$ varies by $\pm kS$, will be at least 2 or 3 times greater than $(f_s)_2$. In the vector diagram of Fig. 3 the mean current $J_0$ is represented by the length $\overline{13, 14}$ and the current $k.S. \cos \psi$ by the length $\overline{14, 15}$—the projection on a fixed vector S of a vector H (of length $k.S.$) turning with the speed $2\pi(F_h - F_s)$ radians/second and forming the angle $\psi$ with the preceding one. The current $J$ varies therefore from the value $$\overline{13, 12}$$

Figure 3:
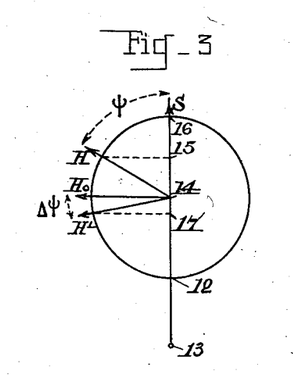
Fig. 3 is a vector diagram showing the relation of values in the circuit of Fig. 2.

(for $\psi = 180°$) to the value $$\overline{13, 16}$$

(for $\psi = 0$). It has been demonstrated that this device is synchronized automatically by merely regulating the condensers 8, 9, and that this synchronism is most stable when the vector H is in the position $H_0$, in quadrature with the vector S. This regulation is obtained by carefully adjusting the condenser 9 so as to bring the current reading in the milliammeter 10 to the mean value $J_0$, whereupon $$F_h = F_s, \quad \psi = \frac{\pi}{2}.$$

This regulation having been effected, the gradual variations $(f_s)_1$ represented in Fig. 1 tend progressively to nullify it. The gradual variation of the current $J$ will be indicated by the milliammeter 10. In short, the maintenance of synchronism demands that every variation $\Delta F_s$ sustained by the carrier frequency should be counterbalanced, as it occurs, by an equal variation $\Delta F_h$ imparted to the frequency of the generator 3 by the control resulting from the connection 11. Since, by construction, a variation $\pm k.S$ in the current $J$ would correct the frequency $F_h$ by the amount $\pm f_h$, it is necessary for said current to vary automatically, by the amount $$\Delta J = KS \frac{\Delta F_s}{f_h}$$

in order to obtain the necessary correction $\Delta F_h = \Delta F_s$. This automatic variation is represented, in Fig. 3, by the length $$\overline{14, 17}.$$

Figure 4:
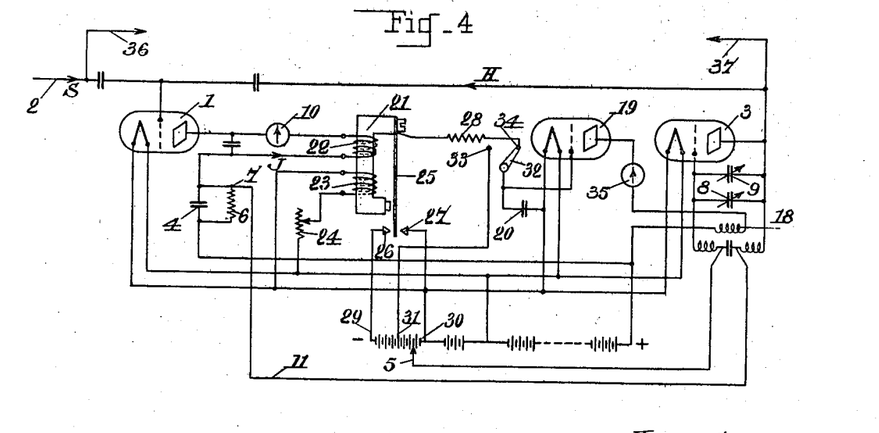
Fig. 4 diagrammatically illustrates the system of my invention showing the means for separately correcting the very gradual variations of considerable amplitude which affect the carrier frequency.

The representative vector H has come into the position $H'$, forming with the normal position $H_0$ an angle $\Delta \psi$. At the end of a longer or shorter period, the variation sustained by the carrier frequency attains a value $(f_s)_1$ for which the error in the angle $\psi$ exceeds the permissible limit. With the circuit as shown in Fig. 2 it then becomes necessary to readjust the setting of the regulating condenser 9 by hand, in order to restore to the current $J$ and angle $\psi$ their normal values, $J_0$ and $\frac{\pi}{2}$ Fig. 4 represents one form of circuit arrangement of my invention which performs these essential adjustments automatically. In addition to the elements already described and to the control, which through the agency of the conductor 11 compels the local generator 3 to follow the relatively rapid but low magnitude variations $(f_s)_2$, a second control is provided by the variations in the resistance of the plate circuit of an auxiliary valve 19, coupled to the generator by a coil 18, as shown. The internal resistance of the valve 19 depends on the bias of its grid, or in other words (the switch 32 being set in its normal position 34) on the potential of the condenser 20. This potential is governed by a relay 21, the armature 25 of which closes the circuit of said condenser, through a very high resistance 28, alternately through two connections 29 and 30 to different potentials on a suitable potential source, both connections 29 and 30 being negative in relation to that of the filament. The time constant of the unit comprising condenser 20 and resistance 28 is equal to several tenths of a second. The potentials of the connections 29, 30 are such that, if they were successively transmitted to the grid of the valve 19, as would occur if the armature 25 rested successively on each of the contacts 26, 27 for any considerable time, the generator 3 would produce, successively, two frequencies differing by several hundred periods. This difference is selected to exceed the variation $(f_s)_1$, eventually produced by the instability of the generators during a long period of service. Given these conditions, it can easily be verified that the frequency $F_h$ of the generator 3 varies in a very gradual manner, for example by some tenths of a period per second, so long as the armature 25 rests on one of the two contacts 26, 27 and that the direction of this frequency variation is reversed when the armature passes from one of the contacts on to the other. The main winding 22 of the relay is traversed by the current $J$, and an auxiliary winding 23 is traversed by an additional current, adjustable by a rheostat 24. The receiver is regulated in the following manner: at the commencement of the operation, when the frequencies $F_s$ and $F_h$ still differ considerably, the current in the milliammeter 10 has the value $J_0$. The switch 32 is set, provisionally, on the contact segment 33, which gives the grid of the valve 19 the polarization 31, that is, the mean between the connections 29 and 30. The rheostat 24 is adjusted so that the armature 25 is in a state of equilibrium between the contacts 26 and 27, without touching either of them. The armature will subsequently pass through this position of equilibrium every time the current $J$ resumes the value $J_0$. As was explained in my application, supra, describing the circuit according to Fig. 2, the condensers 8, 9 of the generator are tuned so as to obtain synchronism and to bring the vector H (Fig. 3) into the position $H_0$, in quadrature with the vector $S$. The current $J$ then resumes the value $J_0$ represented by the length $\overline{13, 14}$.

Finally the switch 32 is returned to the normal position 34, as shown in Fig. 4.

The arrangement operates in the following manner: When this regulation has been effected the slow variation due to the instability of the generators tends to nullify it, and the current $J$ varies, therefore progressively, from the mean value $J_0$. When it attains a certain value $J_0 \pm \Delta J$, that for example, represented by the length $\overline{13, 17}$, the armature 25 comes to rest against the contact 26 or 27 and completes the circuit of the corresponding connection 29 or 30. This results in a gradual variation in the charge of the condenser 20, the polarization of the grid of the valve 19, and the frequency $F_h$ of the generator 3. The representative vector, which is then in the position $H'$, begins to rotate in the suitable direction, which is ascertained by trial by reversing the connections 29 and 30 as required; the said vector returns towards the optimum position $H_0$. The current $J$ acquires a value more closely approximating to $J_0$, the armature 25 moves away from the contact on which it has been bearing and the condenser 20, the circuit of which is again open, retains the acquired potential, until the gradual and uninterrupted variation of the carrier frequency $F_s$ again requires the intervention of the relay. When, at the end of a very long time interval, for instance several hours, the milliammeter 35 indicates that the potential of the condenser 20 nearly attains one of the limits, 29 or 30, beyond which the automatic control would cease to function, the condenser 9 must again be regulated by hand, by temporarily replacing the switch 32 in the position 33. The conductors 36 and 37 (Fig. 4) represent the feeders for the branch circuits for which the signal and the local oscillation are placed in phase before becoming rectified in the second detector valve which permits the reception of the signal.

Another important observation must be made as regards the device illustrated in Fig. 4: It has been stated that "the rheostat 24 is adjusted so that the armature 25 is in a state of equilibrium between the contacts 26 and 27, every time the current $J$ resumes the particular value $J_0$." Now, according to the relation $J = J_0 + KS \cos \Psi$, said particular value $J_0$ is resumed by $J$, both when $\Psi = 90°$ (normal value), or when $S = 0$ (as happens for instance during a deep fading). So, a temporary suppression of control during fading does not affect in any way the local oscillation's frequency $F_h$. As long as the intensity of $S$ remains very small, the circuit of condenser 20 is open, owing to relay 21; said condenser keeps up the potential which it had at the very moment fading began; and the local generator 3 keeps up provisionally the particular frequency $F_h$ imposed on it by said constant potential. Thus, temporary suppressions of control during fading do not change in any way the local generator's frequency. It is quite the reverse of what happened with the frequency control systems previously known.

Summarizing the above-described circuits and operations, it is desired to synchronize a local oscillation $H \sin(2\pi F_h t + \Phi_h)$ *with* a controlling oscillation $S \sin(2\pi F_s t + \Phi_s)$. To obtain such a result, the frequency $F_h$ must necessarily depend in some way either on the phase difference $\Psi$ for perfect synchronism as illustrated and described in my copending application Serial No. 574,858, or on the difference of frequency $F_h - F_s$. The following explanations relate to both methods of control, but for purposes of illustration, I shall consider only the method which utilizes the phase difference $\Psi$.

In Fig. 2 the control exerted upon the local frequency $F_h$ by the current $J$ equals $J_0 + KS \cos \Psi$ and by the conductor 11 is given by:

$$F_h = F_0 + \text{function } (\Psi)$$

where $F_0$ designates the proper frequency which would be taken by generator 3, if the controlling oscillation received by 2 should be non-existing. This is the condition obtained when there is an extended fading interval and S then equals 0. In other words, $F_0$ is the frequency of the generator when the current recorded on milliammeter 10 has the value $J_0$, independent of the controlling oscillation. This is a clear and concise definition of $F_0$. Function $(\Psi)$ is the correction imposed by current $J$ on the local frequency when said current passes from $J_0$ to any other particular value $J_0 + KS \cos \Psi$; i.e. when the variation of the current $J$ is $KS \cos \Psi$. In practice, these frequency corrections are small, and the proportional relation:

$$\text{function } (\Psi) = f_0 . KS \cos \Psi$$

is obtained, in which $f_0$ designates the correction imposed on the local frequency $F_h$ by a unit variation of current $J$. $f_0$ is readily measured and modified, for instance, by changing resistance 6 or by choosing an adequate electron tube 3; but this being done and the apparatus once constructed, $f_0$ is a constant. From the above it is clear that when the two oscillations are in synchronism, the equation of this synchronism is:

$$F_s = F_h = F_0 + f_0 \, KS \cos \Psi \quad (1)$$

This equation signifies that the difference $F_s - F_0$ between the controlling frequency $F_s$ and the generator's proper frequency $F_0$ is at any time compensated by the correction $f_0.KS \cos \Psi$ imposed on said generator by the detected current $KS \cos \Psi$ resulting from the controlling oscillation.

This equilibrium is only possible when $$F_s - F_0 < f_0 \, KS \quad (2)$$

So long as condition 2 is satisfied, the two oscillations automatically maintain a fixed phase relation or phase difference $\Psi$, given by $$\cos \psi = \frac{F_s - F_0}{f_0 . KS} \quad (3)$$

But when $F_s - F_0 > f_0.KS$, synchronism is no longer obtained since it is impossible that $\cos \Psi$ ever be greater than 1. In that case the interfering current $KS \cos \Psi$, whose frequency was previously 0 suddenly becomes oscillatory. When this frequency becomes too high, the current is stopped by the condenser 4 or by the low-pass filter and no longer passes through resistance 6. The two oscillations then become independent of each other and resume their natural frequencies $F_s$ and $F_0$ respectively.

With this brief summary in mind, Fig. 2 showing a single control and Fig. 4 showing a double control of the present application will now be considered. In Fig. 2, at the initial time $T_1$ (Fig. 1), the operator has adjusted condensers 8, 9, so as to bring the two oscillations into quadrature, i.e., to obtain a current $J$, as indicated in milliammeter 10, having the particular value $J_0$. According to Equation 3, if $\Psi$ equals 90°, $\cos \Psi$ equals 0 and the proper frequency $F_0$ of the local generator 3 is equal to the control frequency $F_s$.

As illustrated in Fig. 1, $F_s$ now begins to vary with respect to $F_0$. Phase difference $\psi$ automatically deviates from the initial value 90° and approaches 0° or 180°. From Equation 3, it will be evident that in order to keep the change in phase difference $\psi$ as small as possible for fluctuating values of $F_s$, it is necessary to give $f_0KS$ a large value. For example, should the device be working four hours without any supervision and should slow variation $(f_s)_1$ of control frequency $F_s$ reach 200 cycles, i. e. $[(f_s)_1 = 200]$ at the end of said lapse of time, a correction of 1,000 cycles $(f_0KS = 1,000)$ would be necessary to prevent the variation of angle $\psi$ from exceeding 12°, for instance:

$$\left(\cos \psi = \frac{F_s - F_0}{f_0.KS} = \frac{200}{1000} = 0.2; \psi = 78° = 90° - 12°\right).$$

On the other hand, so large a correction as $f_0KS$ equals 1000 cycles, results in a sacrifice in accuracy. If $KS = 1$ milliampere (current recorded in 10 varying 1 milliampere when $\psi$ passes from the normal value of 90° to the limit 180°), the equation $f_0KS = 1000$ implies that a 0.1 milliampere variation of the detected current imposes a 100 cycles correction to the local frequency $F_h$. Such a high value of $f_0$ results in the synchronism no longer being well protected against electromagnetic perturbations arriving through conductor tubes.

In spite of the excellent selection insured by condenser 4 (in homodyne reception 4,6 acting as a resonator) or by the low pass filter, such perturbations produce small variations $\Delta j$ of the current $J$ in resistance 6 and according to the definition of $f_0$, these accidental variations of $\Delta j$ impose variations $f_0 \Delta j$ on the local frequency. From this point of view, the high value of $f_0$ is undesirable.

Let us now suppose that, at a given time $T_2$ (Fig. 1) the difference $F_s - F_0$ equals 100 cycles. If $f_0KS$ equals 1000, $\cos \psi = 0.1$ and $\psi = 84°$. The working of the device appears to be good. But if there is a long fading interval not compensated by automatic volume control, S becomes very weak and synchronism expressed by Equation (3) no longer exists since $\cos \psi$ cannot exceed 1. The two oscillations become independent of each other and the interfering current frequency passes from 0 to 100 cycles. Such frequency is usually audible in spite of the weakening of S and furthermore, it exceeds the band width of 4,6 (or of the low-pass filter) and prevents the synchronizing current from reaching resistance 6. When fading is over, synchronism is not restored automatically and the operator must readjust condensers 8 and 9.

To sum up, a synchronization obtained by the agency of a single uniting connection or control is limited in operation. Given the important variation $(f_s)_1$ of the control frequency $F_0$, $f_0KS$ must have a very high value and difficulties result therefrom. Accordingly, the double control described in my present application is very desirable. Considering now Fig. 4, it will be noted that current $J = J_0 + KS \cos \psi$ recorded in 10 takes on the same value $J_0$ either when the working is perfect ($\psi = 90°$) or when a fading temporarily suppresses the controlling oscillation ($S = 0$). In both cases the control provided for compensating the slow variation $(f_s)_1$ of $F_s$ is temporarily suppressed, the armature 25 of relay 21 being then halfway from 25 and 26, and the circuit of condenser 20 being open. Said condenser then acts as a biasing source of provisionally constant potential. $F_0$ again designating the proper frequency of generator 3, when independent from the controlling oscillation, it will be seen that the value of $F_0$ at a given time now depends not only on the actual adjustment of condensers 8, 9, but also on the potential acquired by condenser 20. Should condensers 8, 9 be adjusted by hand or should the potential of condenser 20 be automatically modified, the result will be exactly the same, i. e., $F_0$ will be modified.

The part played by the slow uniting connection 22, 21, 25, 28, 20, 19, 18, can therefore be described as follows: this part is intermittent; as long as $\psi$ is very close to 90° (for instance, $85.5° < \psi < 94.5°$) the connection is cut off; but as soon as $\psi$ somewhat differs from 90°, KS cos $\psi$ from zero and J from $J_0$, the uniting connection resumes its part, modifies $F_0$ and brings back J within the chosen limits. This leads exactly to the same result as when an operator frequently adjusts the condensers 8, 9 and thus compels the generator's proper frequency $F_0$ to follow the control frequency's low variations $(f_s)_1$.

The fundamental difference between Fig. 2 and Fig. 4 resides in the fact that in Fig. 2 the proper frequency $F_0$ is a constant whereas in Fig. 4 this frequency is a broken line practically indistinguishable from the average value of $F_s$. The part played by the other control 11 is now merely to maintain the synchronism of two oscillations whose proper frequencies $F_s$ and $F_0$ only differ from each other by the small rapid variations $(f_s)_2$ of $F_s$. According to Equation (3), the maximum correction of $f_0KS$ which connection 11 has to insure, is but very small, for example $6(f_s)_2$, and the drawbacks of Fig. 2 are avoided.

Synchronism is protected in the best possible manner against any kind of electromagnetic interference: indeed, the slow control 22...18 is non-responsive to such interference owing to the slowness of relay 21 and to the high time constant 28, 20. The other control is not much more sensitive to this interference, as the band width of selecting circuit 4, 6 and the maximum correction $f_0KS$ are exclusively imposed by the small variations $(f_s)_2$ and therefore are small themselves. When a fading renders the signal inaudible, it does not matter very much whether or not the oscillations temporarily fall out of synchronism: no hissing due to interference can be heard since the differential frequency $F_s - F_0$ is only of about 1 cycle. As soon as fading is over, the two oscillations automatically come again into synchronism. The whole of the above description can be applied without any modification to the other case, where the synchronizing current is a function, not of the phase difference $\psi$, but of the difference of frequency $F_s - F_0$.

Figure 5:
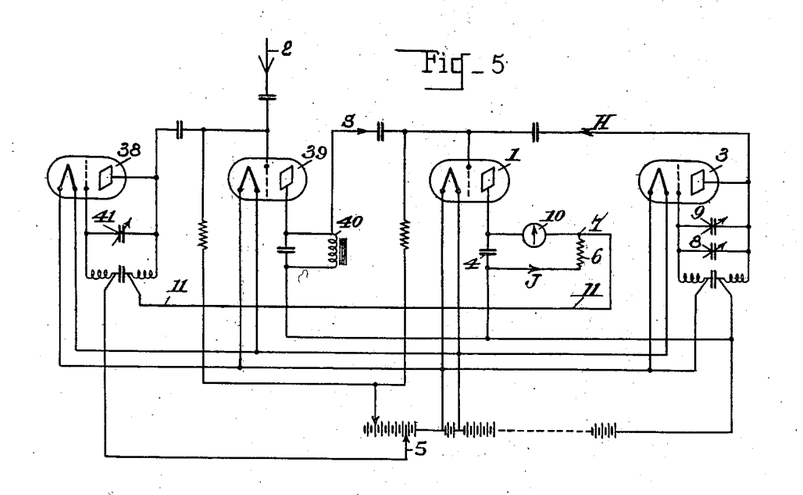
Fig. 5 diagrammatically shows a modified circuit arrangement embodying my invention.
Figure 6:
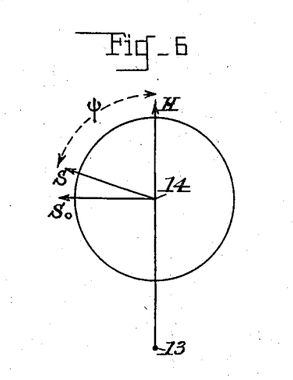
Fig. 6 is a vector diagram of the circuit illustrated in Fig. 5.

In most receivers, the frequency of the signal is modified by a heterodyne. In such case, if $F_1$ be employed to designate the frequency of the carrier or pilot oscillation, as received by the antenna, and $F_2$ to represent the frequency of the heterodyne, the new frequency $F_s$ acquired by the carrier oscillation on arriving at the detector valve 1 will be $F_s = F_1 - F_2$, and depends therefore on the frequency of the heterodyne. It is evident that the synchronism obtained in Fig. 2 by controlling the frequency $F_h$ of the local generator 3 by means of the conductor 11, may equally be obtained by controlling the frequency $F_2$ of the heterodyne by means of the same conductor. This modification is represented in Fig. 5, in which the frequency $F_1$ of the signal received at 2 is modified by the heterodyne 38. The signal, of which the carrier oscillation, $S \sin (2\pi F_s t + \phi_s)$, acquired the new frequency $F_s$ as delivered by the output of the detector 39, is transmitted by suitable circuits, 40 to the detector 1, in which it interferes with the synchronous local oscillation $H \sin (2\pi F_h t + \phi_h)$ furnished by the generator 3. The current in the resistance 6 has the same value $J = J_0 + k.S.\cos \psi$, as before. Through the conductor 11, the connection 7 controls the frequency $F_2$ of the heterodyne 38 and therefore the differential frequency $F_s$ of the carrier oscillation. The explanations furnished respecting Fig. 3 in my patent application describing the arrangement of Fig. 2 may also apply to Fig. 6 in which the vector H, representing the local oscillation, is now stationary, whereas the vector S representing the heterodyned carrier oscillation of the signal becomes mobile. In practice, in order to obtain synchronism and then place the representative vector S in quadrature in the optimum position $S_0$, in which the current J read off in the milliammeter 10 regains the mean value $J_0$, represented by the length 13, 14, either the condensers 8, 9 of the synchronous generator 3 or the condenser 41 of the heterodyne, may be regulated at will.

Figure 7:
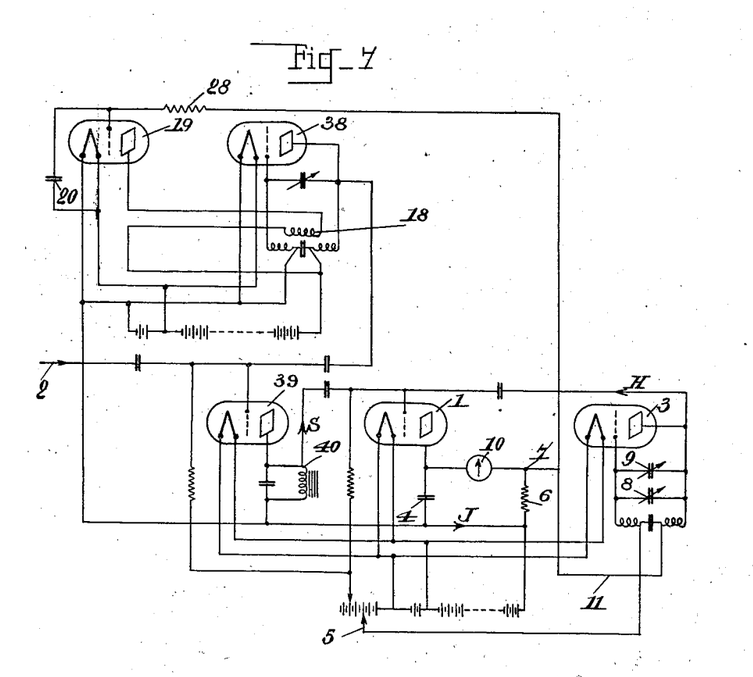
Fig. 7 diagrammatically shows a circuit comprising a combination of the circuit arrangements shown in Figs. 2, 4 and 5, having means for the attainment of synchronism and the correction necessitated by the very gradual variations affecting the frequency of the carrier oscillation.

Consequently the arrangement represented in Fig. 4 may be modified as shown in Fig. 7, in which the control established by the conductor 11 acts, as before on the synchronous generator 3, while the control established by the coil 18 and valve 19 acts on the heterodyne 38. The conductor 11 compels the frequency of the generator 3 to follow the variations, relatively rapid, but of small magnitude, $(f_s)_2$ sustained by the carrier frequency $F_s$. On the other hand, these variations are not transmitted to the valve 19, on account of the very high time constant of the assembly formed by the resistance 28 and condenser 20, but this assembly 28, 20 transmits to the valve 19 the variations of potential applied, at the connection 7, by the progressive variations of the current J resulting from the extremely gradual variations $(f_s)_1$ due to the possible instability of the transmitting station. Hence the double control functions in the manner already described.

Figure 8:
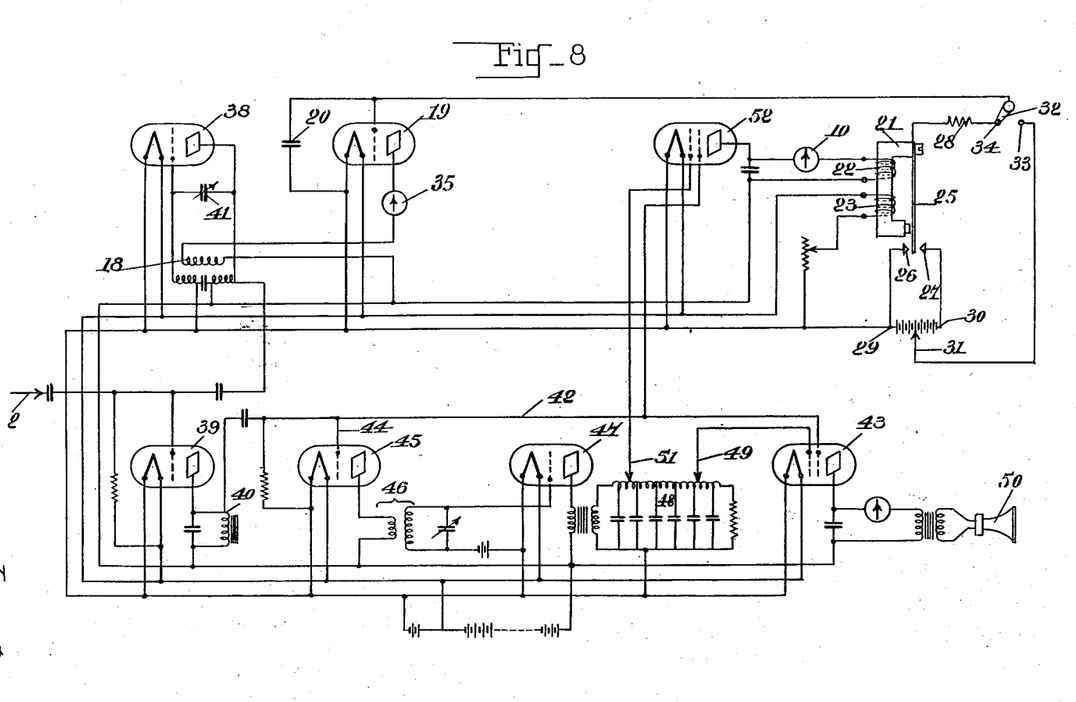
Fig. 8 illustrates a further circuit arrangement showing a modified form of the synchronizing system of my invention.

Fig. 8 shows how the invention is applied when the synchronous local oscillation is obtained by the method described in the United States Patents Nos. 1,491,372 and 1,722,789, and application Serial Number 185,813, and others. In this method the signal received at 2 interferes, in the detector tube 39, with the heterodyne 38, and in the circuit 40, its carrier frequency assumes the differential frequency $F_s$. The circuit 40 supplies two branches. The branch 42 excites the detector valves 43 and 52, which receive the complete signal comprising the heterodyned carrier oscillation and the signal oscillations distributed in the adjacent bands. By means of a valve 45, the other branch 44 excites a resonator or band pass filter 46, tuned to the frequency $F_s$ and constructed so as to allow the frequencies comprised between $F_s - (f_s)_2$ and $F_s + (f_s)_2$, where $(f_s)_2$ represents the variations of Fig. 1, to pass without any notable change of phase. The width $2(f_s)_2$ of the band being extremely small, the circuit 46 arrests the signal oscillations contained in the adjacent bands, and transmits to the valve 47, only the continuous oscillation due to the action of the carrier oscillation. This continuous oscillation is therefore a synchronous local oscillation. A phase corrector, for example an artificial line 48 along which the contact 49 is moved, enables this local oscillation to be brought into phase, in the detector 43, with the carrier oscillation of the signal arriving through the conductor 42. Synchronous reception is thus assured, in the usual manner in the indicator apparatus 50.

Hitherto, the working of this arrangement was rendered impossible by the variation $(f_s)_1$ due to the instability of the transmitting station. Under the influence of these variations, the frequency of the carrier oscillation soon ceases to lie within the limits of the band of the filter 46 and the continuous oscillation sustained a phase displacement rendering reception impossible. This is remedied by disposing on the artificial line 48 a second contact 51 which is adjusted, at the same time that the receiver is regulated, so that in the detector valve 52 the local oscillation is in quadrature in relation to the signal admitted by the conductor 42. The current $J=J_0+k.S.\cos\Psi$ read off on the milliammeter 10 then assumes the mean value $J_0$, and deviates on either side of this mean according as the carrier frequency deviates from the value $F_s$ for which the filter 46 is designed. In fact, the phase of the oscillation transmitted by said filter then varies by a certain amount $\pm\Delta\Psi$, and the current $J$ assumes the new value:

$$J=J_0+k.S.\cos\left(\frac{\pi}{2}\pm\Delta\psi\right)\approx J_0\pm kS\Delta\psi.$$

The current variations actuate the relay 21, and through its agency, the frequency of the heterodyne 38, until the differential carrier frequency again exactly acquires the value $F_s$ at which the current $J$ returns to the mean value $J_0$. This control is operated similar to the arrangement shown in Fig. 4.

The system of my invention has been found to be positive in its operation and extremely accurate in the maintenance of predetermined phase relation between the impressed oscillations and the locally generated oscillations. I have described my invention in certain of its preferred embodiments but it will be understood that modifications may be made and that no limitations upon my invention are intended other than are imposed by the scope of the appended claims.

What I claim as new and desire to secure by Letters Patent of the United States is as follows:

1. A method for maintaining an approximately constant phase difference between two oscillations, the frequencies of either or both of which may undergo very gradual but relatively large changes superimposed on changes of greater rapidity but of lesser magnitude, which comprises so combining in an electron tube circuit the two oscillations as to produce an interference current whose intensity, depending upon the said phase difference, admits simultaneously of very progressive variations produced by said gradual frequency changes, and of more rapid variations produced by said more rapid frequency changes, utilizing through suitable means said more rapid intensity variations to exert on the frequency of one of said oscillations a first control compelling this oscillation to follow the small but rapid frequency changes of the other oscillation, whereby the two oscillations are synchronized; and furthermore utilizing through separate means, said very progressive intensity variations of the said interference current to exert a second frequency control whereby the normal value of the phase difference is maintained.

2. In a system for maintaining an approximately constant phase difference between two oscillations, the frequencies of either or both of which may undergo very gradual but relatively large changes superimposed on changes of greater rapidity but of lesser magnitude, means for effecting locked synchronism between the oscillations comprising a circuit having a band width corresponding with the magnitude of the said more rapid frequency changes, said circuit operating to control the frequency of one of said oscillations to counteract said rapid frequency changes, and means operated by the very slow phase displacements produced between the two so synchronized oscillations by the said gradual frequency changes for controlling the frequency of said one of said oscillations so as separately to counteract the said gradual changes, both of said controlling forces being simultaneously operable.

3. In a system for maintaining an approximately constant phase difference between two oscillations, the frequencies of either or both of which may undergo very gradual but relatively large changes superimposed on changes of greater rapidity but of lesser magnitude, a circuit arrangement including a detector in which said two oscillations are mutually modulated, means for producing a synchronizing current by the mutual modulation having an amplitude depending upon the said phase difference and which admits simultaneously of very gradual variations produced by the gradual frequency changes and more rapid variations produced by the more rapid frequency changes, a selecting circuit for selecting said synchronizing current, the band width of said circuit extending from zero to a limit corresponding with the small magnitude of the more rapid frequency changes, and means connected with said selecting circuit providing two separate controls whereby the normal phase difference is maintained, one of said controls being exerted through a device having a very large time constant so as to be exclusively responsive to the very gradual variations in the amplitude of the synchronizing current.

4. In a system for maintaining a normal phase difference between two oscillations, the frequencies of either or both of which may undergo very gradual but relatively large changes superimposed on changes of greater rapidity but of lesser magnitude, circuits comprising a detector in which the two oscillations are mutually modulated, means for deriving from said mutual modulation a synchronizing current of amplitude varying approximately as the projection of the vector representing one of said oscillations upon the vector representing the other oscillation, a circuit in the output of the detector constituting a selecting path for continuous and low frequency currents, so as to accurately transmit the most rapid variations in the amplitude of the synchronizing current, and means connected with said circuit providing two separate controls whereby the normal phase difference is maintained, one of said controls being exerted through a device having a very large time constant, so as to be exclusively responsive to the very gradual variations in the amplitude of the synchronizing current.

5. In a system for maintaining a normal phase difference between a local oscillation and a received oscillation whose frequency may undergo very gradual but relatively large changes superimposed on changes of greater rapidity but of lesser magnitude, a circuit comprising a local heterodyne generator operating to modify the frequency of the received oscillation, a selecting circuit actuated by said modified received oscillation, the band width of said selecting circuit being approximately equal to the magnitude of the more rapid frequency changes, a local synchronous oscillator, means whereby said rapid frequency changes govern the frequency of said local synchronous oscillator to counteract said rapid frequency changes, and means whereby the very slow phase displacements produced in said selecting circuit by the very gradual but large frequency changes govern the frequency of the heterodyne generator so as to counteract said phase displacement.

6. A method of frequency control, to counterbalance the variations which affect the relative frequency of two oscillations separately generated, said variations due to very gradual but large changes superimposed on changes of much greater rapidity but of small amplitude usually undergone by the natural frequencies of either or both of these oscillations, which consists in maintaining the normal relative frequency of the oscillations by way of two separate frequency controls, a first one of small magnitude but of sufficient rapidity to counterbalance the said small but rapid frequency changes, and a second one very progressive but of large magnitude to separately counterbalance the said gradual but large frequency changes.

7. The method for maintaining a constant frequency relation between two oscillations, the natural frequencies of either or both of which may admit very gradual but relatively large changes superimposed on changes of greater rapidity but of lesser magnitude, which comprises providing a first control for exclusively compelling one of these oscillations to follow the small but rapid frequency changes undergone by the other one, combining the oscillations so as to produce a variable resultant current varying under the joint control of the coacting oscillations, and utilizing the resultant current for actuating a second control whereby the gradual but large frequency changes are separately neutralized.

8. A method of synchronizing two oscillations, the frequencies of either or both of which may undergo very gradual but relatively large changes superimposed on changes of greater rapidity but of lesser magnitude, which comprises, insuring by one frequency control means the synchronism of the oscillations exclusively against the said rapid but small frequency changes, and furthermore producing by the combination of the so synchronized oscillations a variable current whose variations, when exceeding two predetermined limits, exert on the frequency of one of these oscillations through separate frequency control means a very slow operative control, whereby the said current is restored within the said limits.

9. A method of frequency control for maintaining a normal frequency relation between a received oscillation and a local oscillation, the frequencies of either or both of which may undergo very gradual but relatively large changes superimposed on changes of greater rapidity but of lesser magnitude, which comprises, insuring by one frequency control means the synchronism of the oscillations exclusively against the said rapid but small frequency changes, and furthermore producing in a suitable circuit by the joint action of the so synchronized oscillations a variable current whose intensity resumes a particular value when the amplitude of the received oscillation is zero, and when the frequency relation is normal, said variable current, when exceeding two predetermined limits situated on either side of the said particular value, being utilized to exert on the frequency of one of the synchronized oscillations through separate frequency control means a very slow and discontinuous control whereby the said current is restored within the said limits.

10. In a synchronizing system, a source of oscillations of varying frequency, a second source of variable frequency; means under the joint control of said sources for producing a current fluctuating in amplitude over a predetermined range in accordance with the relative frequency fluctuations of said sources, means whereby said current controls the frequency of said variable source, there being a predetermined relationship between each value of said current and the resulting frequency of said controlled source, and means for varying said predetermined relationship of said current and said frequency whereby a same value of current produces a different frequency of said controlled source.

11. A system for maintaining a normal frequency relation between a local oscillation and a received oscillation issued from a Hertzian wave whose frequency may fluctuate rapidly with reference to a slowly variable mean value, which comprises means for producing a synchronizing current from the interference of the said oscillations, means for selectively transmitting the most rapid intensity fluctuations of this current, a plurality of means constituting frequency controls, one of said control means being disposed in the output of said selecting means and responsive to the rapid fluctuations of the synchronizing current, another of said control means being slowly operative when the mean value of this current departs from zero.

12. A system for maintaining a local oscillation in quadrature with a second oscillation issued from a received wave, which comprises: means for producing by interference of these oscillations a synchronizing current whose intensity is zero when the said oscillations are in quadrature; a relay having an armature, a contact on each side thereof, and a main winding; a circuit forming a path for said synchronizing current and including said winding, said armature being movable between said contacts, two biasing circuits respectively connected with the said contacts; adjusting means whereby one of said biasing circuits or the other is closed by the armature according as the synchronizing current is positive or negative, both circuits being opened when the said current is zero; a plurality of means constituting frequency controls, one of said control means being responsive to the action of the synchronizing current through electrical circuits, another of said control means being operative to increase or lessen the controlled frequency according as one or the other of the said biasing circuits is closed by the armature.

HENRI JEAN JOSEPH MARIE DE
REGNAULD DE BELLESCIZE.